(12) United States Patent
Kochergin

(10) Patent No.: US 8,303,176 B2
(45) Date of Patent: Nov. 6, 2012

(54) CRYOGENIC FIBER OPTIC TEMPERATURE SENSOR AND METHOD OF MANUFACTURING THE SAME

(76) Inventor: Vladimir Kochergin, Christiansburg, VA (US)

(*) Notice: Subject to any disclaimer, the term of this patent is extended or adjusted under 35 U.S.C. 154(b) by 545 days.

(21) Appl. No.: 12/777,305

(22) Filed: May 11, 2010

(65) Prior Publication Data
US 2011/0280280 A1 Nov. 17, 2011

(51) Int. Cl.
*G01K 11/32* (2006.01)
*G01K 11/12* (2006.01)
*G02B 6/036* (2006.01)

(52) U.S. Cl. ......... 374/161; 374/131; 374/E11.016; 374/E13.004; 385/12; 385/128

(58) Field of Classification Search ............. 374/130, 374/131, 161, E11.015, E11.016, E13.004, 374/E13.005; 385/12, 128, 141
See application file for complete search history.

(56) References Cited

U.S. PATENT DOCUMENTS

| | | | | |
|---|---|---|---|---|
| 4,778,244 A * | 10/1988 | Ryan | ............... | 385/100 |
| 5,251,274 A * | 10/1993 | Carlstrom et al. | ............... | 385/13 |
| 6,067,392 A * | 5/2000 | Wakami et al. | ............... | 385/37 |
| 6,072,922 A * | 6/2000 | Albin et al. | ............... | 385/12 |
| 6,233,386 B1 * | 5/2001 | Paek et al. | ............... | 385/123 |
| 6,240,225 B1 * | 5/2001 | Prohaska | ............... | 385/37 |
| 6,466,716 B1 * | 10/2002 | Ogle | ............... | 385/37 |
| 6,807,341 B2 * | 10/2004 | Albert | ............... | 385/37 |
| 7,106,941 B2 * | 9/2006 | Matano et al. | ............... | 385/147 |
| 2012/0177319 A1 * | 7/2012 | Alemohammad et al. | ...... | 385/12 |

FOREIGN PATENT DOCUMENTS

JP 56014207 A * 2/1981
JP 62118313 A * 5/1987

* cited by examiner

*Primary Examiner* — R. A. Smith

(57) ABSTRACT

This invention teaches the fiber optic sensors temperature sensors for cryogenic temperature range with improved sensitivity and resolution, and method of making said sensors. In more detail, the present invention is related to enhancement of temperature sensitivity of fiber optic temperature sensors at cryogenic temperatures by utilizing nanomaterials with a thermal expansion coefficient that is smaller than the thermal expansion coefficient of the optical fiber but larger in absolute value than the thermal expansion coefficient of the optical fiber at least over a range of temperatures.

31 Claims, 7 Drawing Sheets

FIGURES
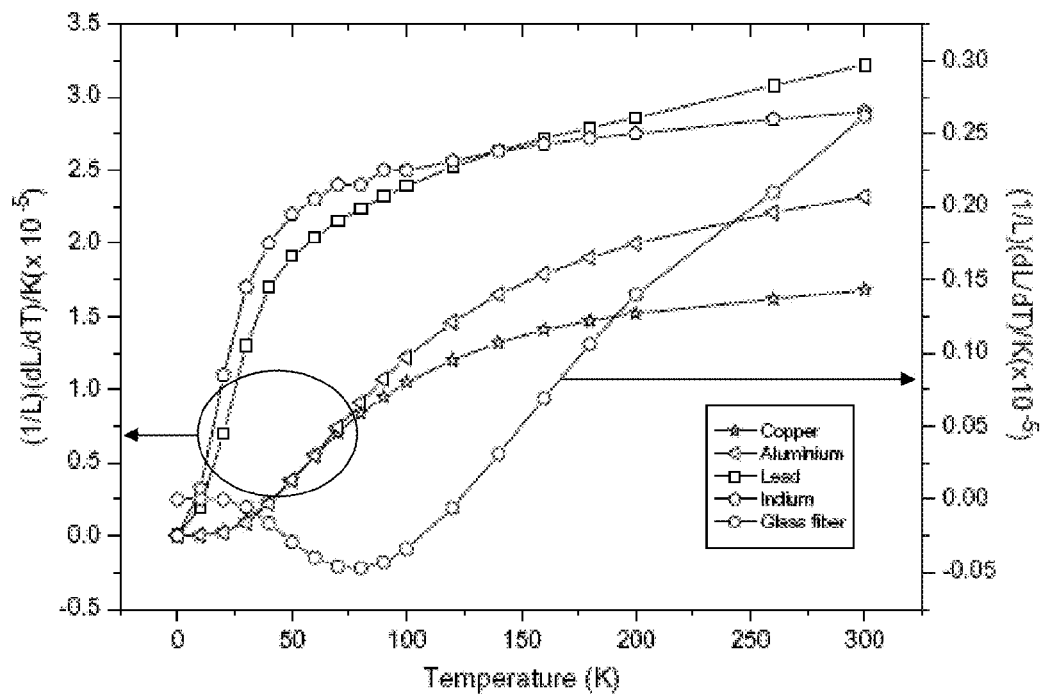
Figure 1. *PRIOR ART*
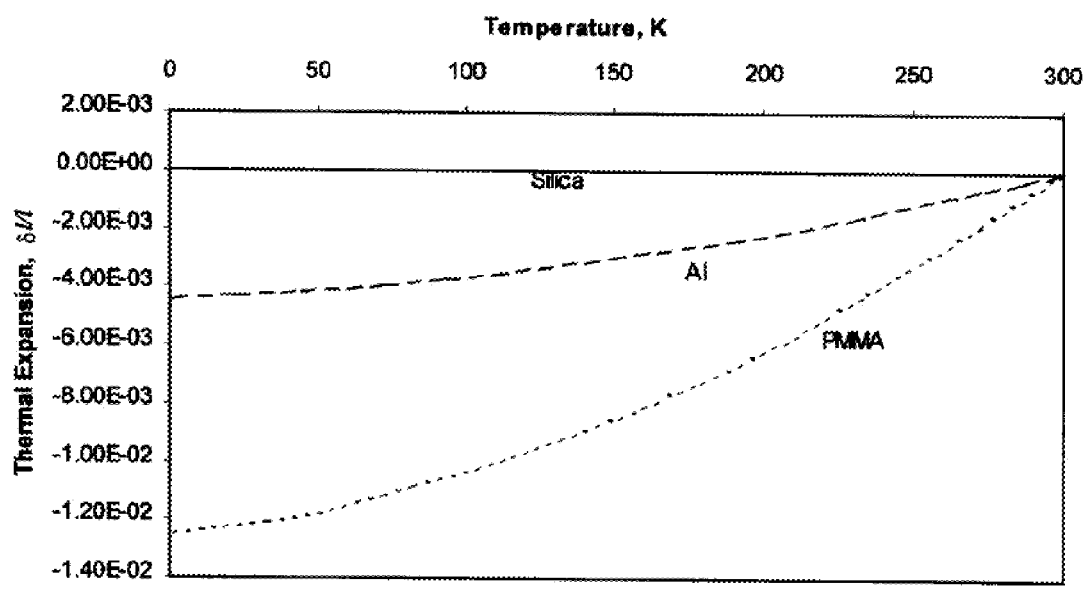
Figure 2. *PRIOR ART*

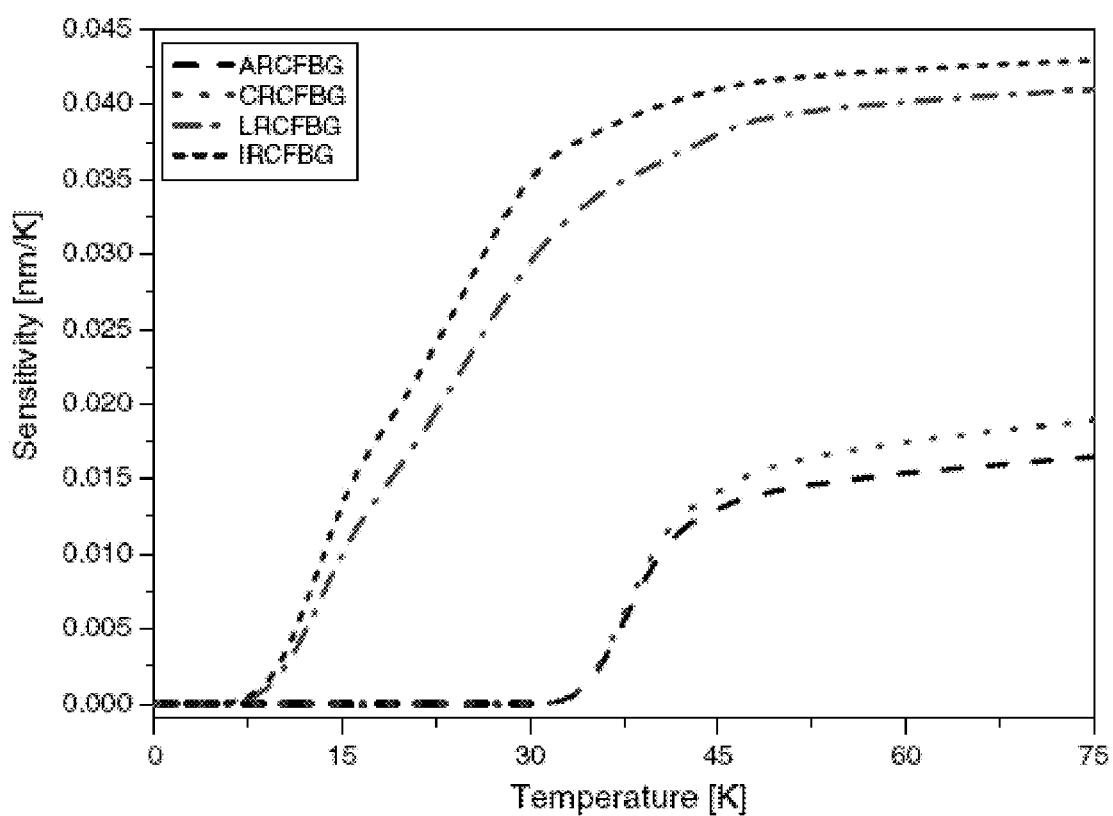
Figure 3. *PRIOR ART*

CRYOGENIC FIBER OPTIC TEMPERATURE SENSOR AND METHOD OF MANUFACTURING THE SAME

STATEMENT REGARDING FEDERALLY SPONSORED RESEARCH OR DEVELOPMENT

This invention was made with Government support under contracts NNX10CD42P awarded by NASA and DE-SC0001964 awarded by DoE. The Government has certain rights in this invention.

CROSS-REFERENCES TO RELATED APPLICATIONS

Not applicable.

FIELD OF THE INVENTION

The present invention relates to fiber optic sensors temperature sensors for cryogenic temperature range and method of making the same. In more detail, the present invention is related to enhancement of temperature sensitivity of fiber optic temperature sensors at cryogenic temperatures by utilizing nanomaterials with enhanced values of thermal expansion coefficients at cryogenic temperatures.

BACKGROUND OF THE INVENTION

A number of applications require temperature measurements in a number of different spatial locations at cryogenic temperatures (below 77K). These include superconductive cavity characterization for particle accelerators, superconducting power lines, NMR instrumentation and many more. Electronic temperature sensors (typically resistors or diodes of various types, less often thermocouples) while offering proven solution, have a number of deficiencies originating from poor multiplexing capability of such sensors as well as sensitivity to the magnetic fields.

Various types of fiber optics sensors are known to those skilled in the art, which offer high levels of multiplexing. These include Fiber-Bragg Grating (FBG) sensors, Fabry-Perot Interferometer, FPI, (extrinsic or intrinsic), Rayleigh scattering-based sensors, Raman scattering-based sensors and Brillouin scattering-based sensors (in scattering-based sensing systems typically sections of the fiber serve as sensors). Also incorporated here as a reference are fluorescence lifetime-based sensors. Fiber optic sensors are currently being used for a number of applications where high level multiplexing and/or Electromagnetic Interference (EMI) immunity are required. However, to date highly multiplexible fiber optic temperature sensing solutions were unable to meet the required levels of resolution and accuracy at cryogenic temperatures. Fluorescence lifetime-based fiber optic temperature sensors are the exception; however, such sensors are poorly multiplexible.

For example, FBG, FPI and Rayleigh scattering-based sensors are utilizing the combination of thermal expansion (characterized by coefficient of thermal expansion, CTE) and thermo-optical effect (characterized by thermo-optic coefficient) as mechanisms of transduction of temperature signal into optical signal.

At room temperatures and above the thermal expansion and thermo-optic coefficients of silica are sufficiently high to allow utilization of optical fiber itself or optical fiber with written FBG. However, thermal expansion coefficient [Johnson V J. Properties of materials at low temperature. Pergamon Press; 1961] and thermo-optic coefficient [Bradley J. Frey et al. Cryogenic temperature-dependent refractive index measurements of N-BK7, BaLKN3, SF15, and E-SF03; Proc. SPIE, Vol. 6692, 669205 (2007)] of silica decrease dramatically at cryogenic temperatures (see FIG. 1) preventing achievability of acceptable levels of accuracies and resolutions of fiber optic temperature sensors.

To address this problem, U.S. Pat. No. 6,072,922 teaches of using the coating with a thermal expansion coefficient that is larger than the thermal expansion coefficient of the optical fiber for increasing the sensitivity of the sensor to changes in temperature at the location. Both FBG and long period fiber grating are taught and aluminum ("Al") (which can be integrated with the fiber, for example, through sputter depositing) or polymethyl methacrylate ("PMMA") (which can be integrated as a coating, for example, by polymerization) are disclosed as possible realizations of coating materials. As it is illustrated in from FIG. 2, these materials indeed have significantly higher CTE than that of silica. While such a solution indeed showed improved levels of temperature resolution at cryogenic temperatures, it possessed two major deficiencies: 1) CTE of these materials is still significantly diminishes as temperature approaches ~20K, 2) Significantly different CTEs of silica core of the fiber and the coating with a thermal expansion coefficient that is larger than the thermal expansion coefficient of the optical fiber are causing significant stress on the interface between the fiber and the coating. These stresses are often causing delamination of the coating and/or breakage of the fiber. Sham-Tsong Shiue et al. [Effect of coating thickness on thermal stresses in tungsten-coated optical fibers, J. Appl. Phys., Vol. 87, No. 8, 3760 (2000)] showed that for metal coating (tungsten coating was considered in detail) maximal metal coating thickness exists (~100-200 nm) after which delamination and/or fiber breakage is inevitable upon cooling the coated fiber. R. Rajini-Kumar et al. [Performance evaluation of metal-coated fiber Bragg grating sensors for sensing cryogenic temperature Cryogenics 48 (2008) 142-147] recently studied aluminum (Al), copper (Cu), lead (Pb) and indium (In) coated FBG sensors and demonstrated that indium and lead coating enlarge the operational range of fiber optic sensors down to ~15K (see FIG. 3). Still reliable, multiplexible fiber optic sensors for liquid He temperatures (2K to 5K) are missing.

SUMMARY OF THE INVENTION

It is an object of the present invention to provide a new design fiber optic temperature sensor that would provide practical levels of sensitivity at cryogenic temperature range (down to 2K or below) and will be multiplexible, inexpensive and easy to manufacture. It is another object of the present invention to provide a practical method of fabrication of fiber optic temperature sensors for cryogenic temperature range.

According to the first embodiment of the present invention the fiber optic temperature sensor comprises the optical fiber for carrying an optical signal, the optical fiber having: a length, a thermal expansion coefficient, at least one core and at least one cladding, the sensor further comprising: at least one grating associated with the core of the optical fiber at a location along the length of the optical fiber, the grating for selectively altering portions of the signal carried by the optical fiber; and a coating integrated with the cladding at the location, the coating for increasing the sensitivity of the sensor to changes in temperature at the location, the coating having a thermal expansion coefficient that is smaller than the thermal expansion coefficient of the optical fiber but larger in absolute value than the thermal expansion coefficient of the optical fiber at least over a range of temperatures. It is further preferable that the sign of the thermal expansion coefficient is changing from positive to negative at some temperature between the cryogenic temperature range (which is understood to be 77K or below) and room temperature. In such a realization the disclosed fiber optic temperature sensor will have significant sensitivity at cryogenic temperature range (due to much higher absolute value of thermal expansion coefficient of the coating compared to that of silica) while the delamination/fiber breakage issues will be resolved due to minimized stress in the interface of the silica and coating due to change of sign of CTE of the coating between the room temperature and the cryogenic temperature. According to one illustrative example, the coating material may comprise the composite consisting of CuO nanoparticles with diameters in the 2 nm to 15 nm range dispersed in epoxy resin host, further denoted as a composite of the present invention. According to another illustrative example, the coating material may comprise the composite consisting of nanoparticles of antiperovskite-structured material dispersed in epoxy resin, said antiperovskite-structured material being selected from the group consisted of $Mn_3CuN$ and $Mn_3ZnN$, said antiperovskite-structured material being doped by the chemical element selected from the group consisted of Ge, Sn, Ga, Nb, Si.

According the second embodiment of the present invention the fiber optic temperature sensor of the present invention comprises Rayleigh scattering-based sensor, which comprises, the optical fiber for carrying an optical signal, said optical fiber having a length, a thermal expansion coefficient, at least one core and at least one cladding, the sensor further comprising at least one section of the optical fiber at a location along the length of the optical fiber; and a coating integrated with the cladding at the location of said section, the coating for increasing the sensitivity of the sensor to changes in temperature at the location, the coating having a thermal expansion coefficient that is smaller than the thermal expansion coefficient of the optical fiber but larger in absolute value than the thermal expansion coefficient of the optical fiber at least over a range of temperatures.

BRIEF DESCRIPTION OF THE DRAWINGS

These and other features and advantages of presently preferred non-limiting illustrative exemplary embodiments will be better and more completely understood by referring to the following detailed description in connection with the drawings, of which:

FIG. 1 is an exemplary plot showing thermal expansion coefficient of different materials (after [Johnson V J. Properties of materials at low temperature. Pergamon Press; 1961]);

FIG. 2 is an exemplary plot showing the thermal expansion of silica, aluminum ("Al") and polymethyl methacrylate ("PMMA") versus temperature, with the relative difference in thermal expansion of silica being shown as approximately two orders of magnitude smaller than that of Al and PMMA. After U.S. Pat. No. 6,072,922;

FIG. 3 shows the sensitivity of different metal-coated FBG sensors after [R. Rajini-Kumar et al. Performance evaluation of metal-coated fiber Bragg grating sensors for sensing cryogenic temperature Cryogenics 48 (2008) 142-147];

DESCRIPTION OF THE INVENTION

Figure 4:
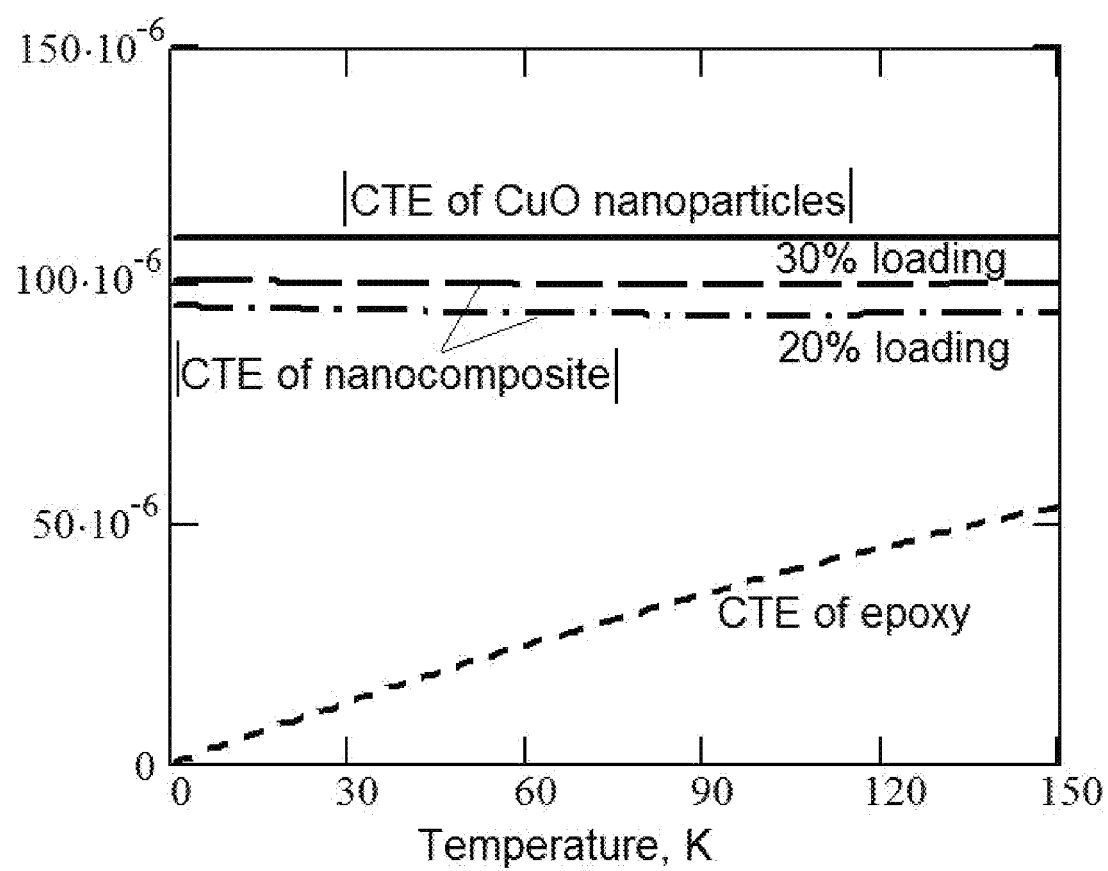
FIG. 4 shows an exemplary illustrative simulated plot of temperature dependence of coefficient of thermal expansion (CTE) of epoxy resin, absolute values of CTE of CuO nanoparticles, absolute values of CTE of nanocomposite of the present invention with 20% and 30% loading of CuO nanoparticles.

According to the present invention, a fiber optic temperature sensor for cryogenic temperature range is provided, wherein the optical fiber is coated with the coating that exhibits a thermal expansion coefficient that is lower than the thermal expansion coefficient of the optical fiber but higher in absolute value than the thermal expansion coefficient of the optical fiber at least over a range of temperatures for increasing the sensitivity of the sensor to changes in temperature at the location. Said coating is preferably having negative thermal expansion coefficient over a range of temperatures. It is further preferable that the sign of the thermal expansion coefficient is changing from positive to negative at some temperature between the cryogenic temperature range (which is understood to be 77K or below) and room temperature. In such a realization the disclosed fiber optic temperature sensor will have significant sensitivity at cryogenic temperature range (due to much higher absolute value of thermal expansion coefficient of the coating compared to that of silica) while the delamination/fiber breakage issues will be resolved due to minimized stress in the interface of the silica and coating due to change of sign of CTE of the coating between the room temperature and the cryogenic temperature.

One nonlimiting example of the coating material of the present invention is a nanocomposite material comprising copper oxide (CuO) nanoparticles with diameter in the range of 3 nm and 15 nm, preferably in the range of 3 nm and 7 nm, dispersed in polymer matrix, which can be epoxy resin matrix or from polyimide material. The loading ratio (the volumetric filling fraction) of CuO nanoparticles should be preferably in the range of 5% and 30%. The unusually high in absolute value ($-1.1 \times 10^{-4}$ $K^{-1}$) negative CTE of CuO nanoparticles with diameters around 5 nm was the recently observed at low temperatures [Zheng, X. G. et al. Nature Nanotech. 3, 724-726 (2008)] with CTE changing sign around 180K. The nanocomposite containing significant volume filling fraction of such nanoparticles dispersed in matrix with Young's modulus significantly lower than that of CuO nanoparticles will in turn exhibit significant negative CTE at cryogenic temperatures as well as low stress at the interface with silica fiber.

Another nonlimiting example of the coating material of the present invention is a nanocomposite material comprising nanoparticles of antiperovskites with diameter in the range of 3 nm to 100 nm dispersed in the polymer matrix which can be epoxy resin matrix or from polyimide material. Said antiperovskite material should be selected from the group consisted of $Mn_3CuN$ and $Mn_3ZnN$, said antiperovskite-structured material being doped by the chemical element selected from the group consisted of Ge, Sn, Ga, Nb, Si. Large in absolute values negative CTE at low temperatures in such materials was reported recently as well (e.g., [Z. H. Sun et al., Giant negative thermal expansion in ultrafine-grained $Mn_3(Cu_{1-x}Ge_x)N(x=0.5)$ bulk, J. Phys. D: Appl. Phys. 42 (2009) 122004]). Similar loading of the nanocomposite as described above in relation to CuO nanoparticles is applied to this aspect of the present invention as well.

For a nonlimiting example, let's consider the case of FBG sensor as a transduction mechanism. First, let's estimate the thermoelastic properties of the nanocomposite containing CuO nanoparticles dispersed in epoxy resin, which can be cryogenic epoxy or other type of polymer known to those skilled in the art. In order to do that we will need to estimate the Young's modulus, Poisson ratio and CTE of the CuO nanoparticles as well as of the composite. While no experimental data is available for the Young's modulus (E) of CuO nanoparticles, the data for CuO nanowires is available [E. P. S. Tan et al. Appl. Phys. Lett. 2007]: it was shown that Young's modulus of CuO nanowires is increasing with reduction of nanowire dimensions and with minimization of surface roughness. For CuO nanowires with high surface roughness it was found to be around 900 GPa and for roughly 70 nm diameter nanowires with smaller surface roughness it was found to be around 300 GPa. For conservative estimation we will use the assumption of $E_{CuO}=300$ GPa for 5 nm nanoparticles at room temperature.

Temperature dependence of Young's modulus of CuO nanoparticles is can be expected to follow that of polycrystalline bulk CuO [X. N. Ying, Y. N. Wang, "Mechanical spectra measurement to probe the magnetolattice coupling in cupric oxide," Physica B 370 (2005) 146-150]:

$$\frac{E(T)}{E(90K)} = \begin{cases} 1.04412 - 0.000297T, & T > T_{N1} \\ 1.08813 - 0.000488T, & T_{N2} < T < T_{N1} \\ 1.0233 - 0.000179T, & T < T_{N2} \end{cases}$$

With the decrease of temperature, CuO undergoes a two-stage magnetic transition: at $T_{N1}=230K$ an incommensurate magnetic structure is observed, while at $T_{N2}=213K$ spin order parallel to the b-axis antiferromagnetically along the [1 0 1] chains and ferromagnetically along the [1 0 1] chains [B. X. Yang, T. R. Thurston, J. M. Tranquada, G. Shirane, Phys. Rev. B 39 (1989) 4343]. The temperature dependence of mechanical properties of some cryogenic epoxies can be found in, e.g., [H. Cease, P. F. Derwent, H. T. Diehl, J. Fast, D. Finley, Measurement of mechanical properties of three epoxy adhesives at cryogenic temperatures for CCD construction, Fermilab-TM-2366-A Nov. 6, 2006] and [G. Schwarz, Thermal expansion of polymers from 4.9. K to room temperature, Cryogenics 1988 Vol. 28, p. 248].

To estimate CTE of the nanocomposite coating of the present invention one can use the well established equation (see, e.g., [R. A. Schapery, Thermal Expansion Coefficients of Composite Materials Based on Energy Principles, J. Comp. Materials, Vol. 2, pp. 30, 1968]):

$$\alpha^* = \frac{K_1 \alpha_1 V_1 + K_2 \alpha_2 V_2}{K_1 V_1 + K_2 V_2}$$

Where $\alpha_i$ are CTEs, $V_i$ are volume fractions $$K_i = \frac{E_i}{3(1-2v_i)}$$

are bulk moduli and $v_i$ are Poisson's ratios of epoxy and nanoparticles respectively.

FIG. 4 shows an exemplary illustrative simulated plot of temperature dependence of coefficient of thermal expansion (CTE) of epoxy resin, absolute values of CTE of CuO nanoparticles, absolute values of CTE of nanocomposite of the present invention with 20% and 30% loading of CuO nanoparticles. One can see that very significant enhancement of the absolute value of CTE of the composite compared to that of epoxy, especially at cryogenic temperatures.

Next property of the nanocomposite of the present invention that should be estimated to predict the sensitivity of the fiber optic sensor having the coating as a nanocomposite of the present invention is the effective Young's modulus of the nanocomposite. As was shown by Pal et al. ["New models for effective Young's modulus of particulate composites" Composites: Part B 36 (2005) 513-523] when particles of high E material are dispersed in matrix with lower E, one can use the following equation to estimate the effective Young's modulus of the nanocomposite E*:

$$E^* = E_m \left\{ 1 + \left[ \frac{15 \frac{E_d}{E_m} - 10(1+v_d)}{6 \frac{E_d}{E_m} + 6(1+v_d)} - \frac{(1-2v_d)}{3 \frac{E_d}{E_m} + 4(1-2v_d)} \right] f \right\}$$

where subscripts d and m stand for CuO nanoparticles and matrix respectively.

Spectral position of FBG reflection peak (measured parameter in FBG sensors) is defined by period of the grating ($\Lambda$) and effective refractive index (n) of the fiber mode:

$$\lambda_{FBG} = 2\Lambda n$$

Temperature sensitivity of FBG sensor is thus:

$$\Delta \lambda_{FBG} = 2\left(n \frac{\Delta \Lambda}{\Delta T} + \Lambda \frac{\Delta n}{\Delta T}\right) \Delta T = 2\Lambda \left(\frac{\partial n}{\partial T} + n\varepsilon\right) \Delta T$$

Where $$\varepsilon = \frac{\Delta \Lambda}{\Lambda}$$

is the strain due to thermal expansion. To find the strain in the coated optical fiber one can use exact solution of the problem [E. Suhir, Mechanical Approach to the Evaluation of the Low Temperature Threshold of Added Transmission Losses in Single-Coated Optical Fibers, J. OF LIGHTWAVE TECHNOLOGY, VOL. 8. NO. 6. 1990, p. 863]. One then can derive:

$$\Delta\lambda_{FBG} = 2\Lambda\left(\frac{\partial n}{\partial T} - n\left[\alpha_{SiO_2} + \frac{\lambda_{SiO_2}}{\lambda_{SiO_2} + \lambda_c}(\overline{\alpha}^* - \alpha_{SiO_2})\right]\right)\Delta T$$

Where $$\overline{\alpha}^* = \frac{1}{\Delta T}\int_{T_0}^{T} \alpha^* \, d\tau$$

is the temperature integrated "effective" CTE of the nanocomposite fiber coating, $$\lambda_{SiO_2} = \frac{1}{\pi E_{SiO_2} r_{SiO_2}^2}, \lambda_{SiO_2} = \frac{1}{\pi E_{SiO_2}[(r_{SiO_2} + D)^2 - r_{SiO_2}^2]},$$

$r_{SiO_2}$ is the radius of the fiber and D is the thickness of the nanocomposite coating.

Figure 5:
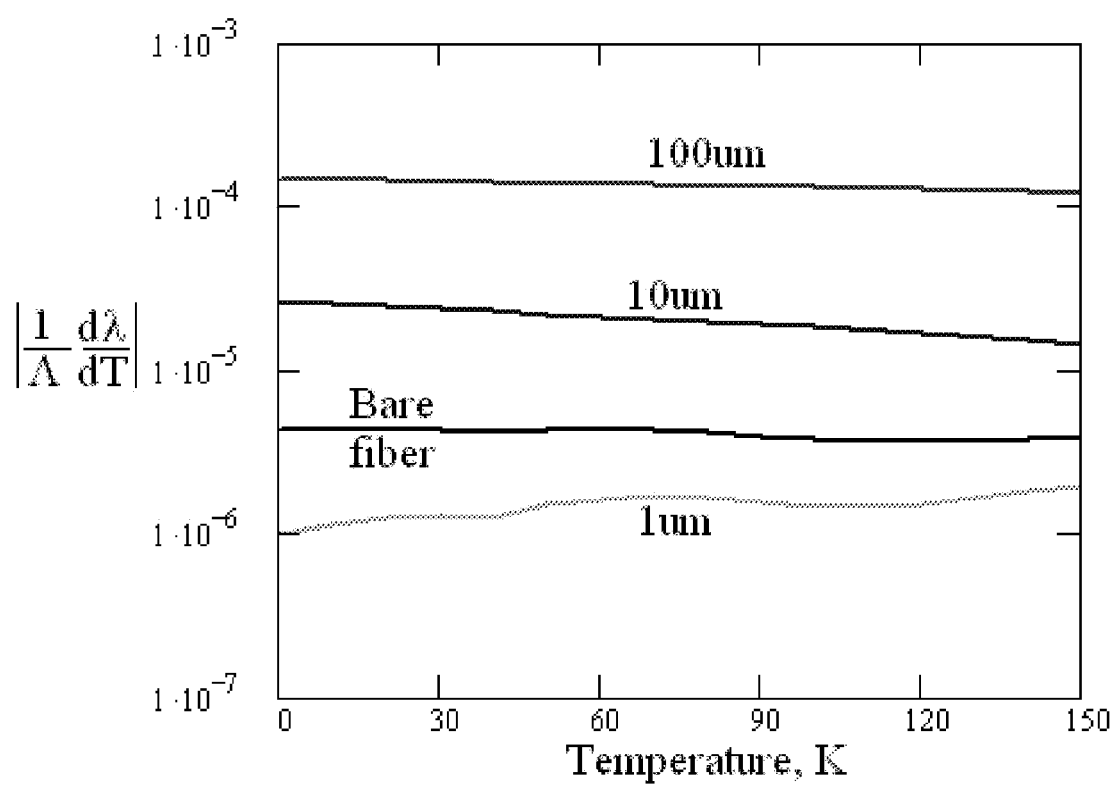
FIG. 5 shows an exemplary illustrative simulated logarithmic plot of temperature dependence of dimensionless temperature sensitivities of FBG sensors of the present invention for different thicknesses (no coating, 1 um, 10 um and 100 um) of coatings of CuO nanoparticles/epoxy resin nanocomposite. 30% loading of CuO nanoparticles in nanocomposite was assumed.

Results of modeling of dimensionless sensitivity of FBG sensor with nanocomposite coating are given in FIG. 5, which shows an exemplary illustrative simulated logarithmic plot of temperature dependence of dimensionless temperature sensitivities of FBG sensors of the present invention for different thicknesses (no coating, 1 um, 10 um and 100 um) of coatings of CuO nanoparticles/epoxy resin nanocomposite. 30% loading of CuO nanoparticles in nanocomposite was assumed. One can see that almost two orders of magnitude enhancement of FBG temperature senility is predicted for 100 um thick coatings of the present invention.

Figure 6:
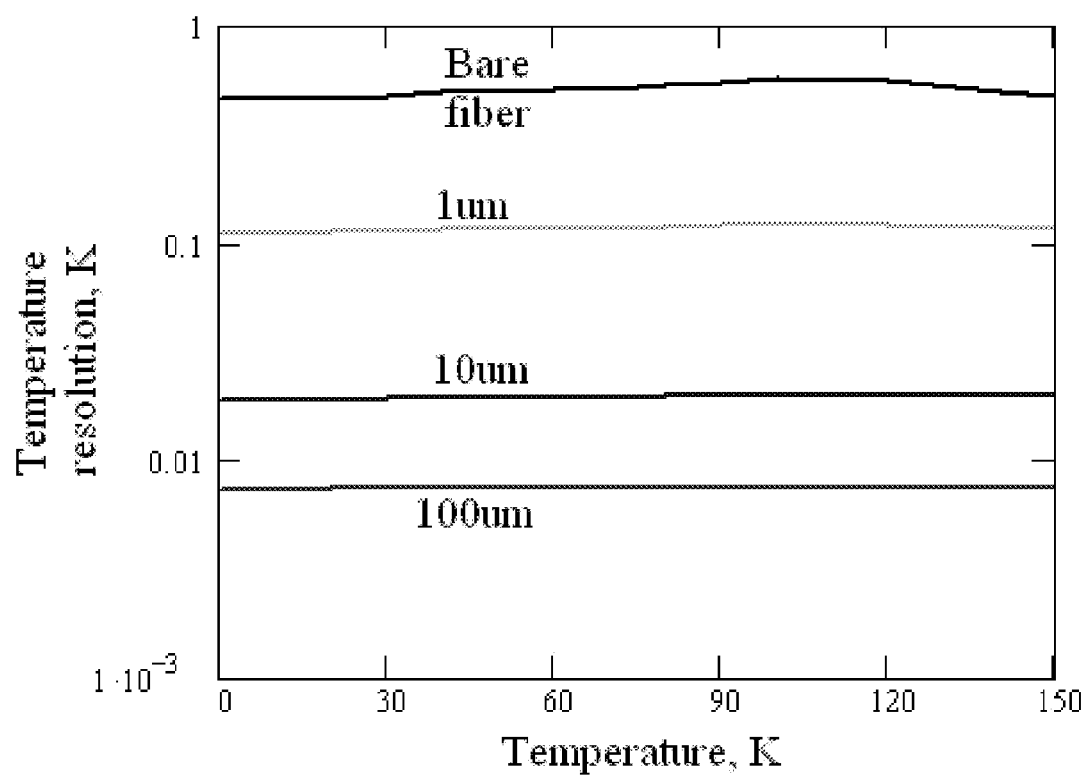
FIG. 6 shows an exemplary illustrative simulated logarithmic plot of temperature dependence of temperature resolution of FBG sensors of the present invention for different thicknesses (no coating, 1 um, 10 um and 100 um) of coatings of CuO nanoparticles/epoxy resin nanocomposite. 30% loading of CuO nanoparticles in nanocomposite was assumed. 1 pm spectral resolution of interrogation instrument was further assumed.

To convert the dimensionless temperature sensitivity of the Fiber Bragg Grating temperature sensor into temperature resolution of the temperature sensing system, one have to use certain assumptions on the spectral resolution of the interrogation instrumentation. Many different types of FBG interrogation instruments are known to those skilled in the art. In this illustrative example we will assume 1 pm spectral resolution around 1550 nm wavelength, as it is provided by commercially available tunable-laser based interrogators (such as, for a nonlimiting example, from Micron Optics, Inc.). The results of simulations are provided in FIG. 6, which shows an exemplary illustrative simulated logarithmic plot of temperature dependence of temperature resolution of FBG sensors of the present invention for different thicknesses (no coating, 1 um, 10 um and 100 um) of coatings of CuO nanoparticles/epoxy resin nanocomposite. 30% loading of CuO nanoparticles in nanocomposite was assumed. One can see that resolution of nanocomposite-coated FBG temperature sensor of the present invention is by almost 2 orders of magnitude higher than that of uncoated fiber at low temperatures. It should be noted that typically the sensitivity of prior art optical fiber sensors is typically significantly below that predicted for the bare fiber since optical fiber sensors have to be coated (bare fiber is too fragile by itself) with, for example, polyacrylate or polyimide, and these coatings diminish further already small sensitivity of fiber sensors since CTE of these materials approaches zero as temperature approaches OK. Hence, in reality, more than two orders of magnitude of improvement of sensitivity and resolution of the FBG temperature sensors of the present invention can be expected compared to the prior art, thus enabling a plethora of new applications for fiber optic sensing at cryogenic temperature range.

Another important property of the disclosed nanocomposite fiber coating is significantly reduced delamination/fiber breakage problem. This problem occurs due to axial pressure at the interface of the silica fiber and coating due to different CTEs of these materials and was significant for prior art attempts to improve the temperature sensitivity of fiber optic sensors at cryogenic temperature. Mathematically the axial pressure at the interface of the silica fiber and coating is equal to:

$$P(T) = \frac{1}{\lambda_{SiO_2} + \lambda_c}\left(\frac{1}{\Delta T}\int_{T_0}^{T} \alpha^* \, d\tau - \alpha_{SiO_2}\right)\Delta T.$$

Where $T_0$ is the temperature at zero pressure (which is typically defined by processing, for example, by temperature of curing of the nanocomposite coating).

Let's consider again the case of CuO nanoparticles/epoxy resin nanocomposite coating for a nonlimiting example: As was shown by Zheng, X. G. et al. [Nature Nanotech. 3, 724-726 (2008)], the sign of CTE coefficient of CuO nanoparticles (and hence of nanocomposite) is changing around 200K. Hence, the integral of nanocomposite CTE in the above equation is expected to be very small (under the assumption of curing temperature of the nanocomposite matrix in the range of 90° C. to 300° C.) and the build-up pressure at the interface of nanocomposite and silica to be sufficiently small to avoid delaminations/fiber breakage for coatings up to few 100s of micrometers thick. This is in contrary to prior art materials (e.g., metals or polymers with high positive CTE value over the range of temperatures), where axial pressure buildup often resulted in coating delamination and/or fiber breakage.

Figure 7:
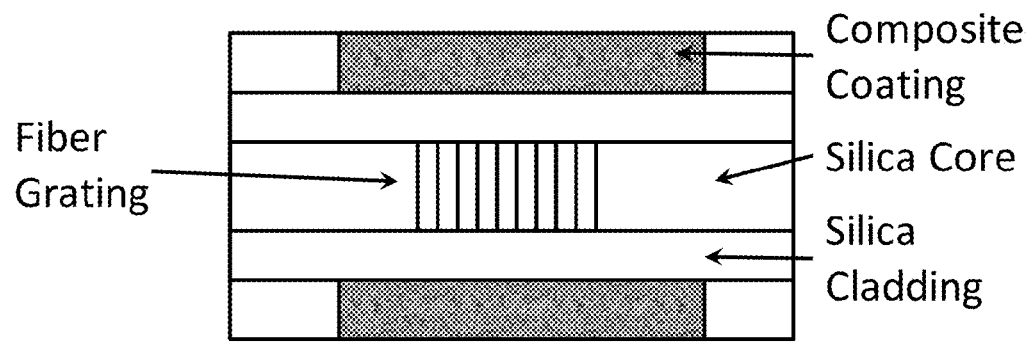
FIG. 7 shows an illustrative exemplary schematic drawing of the fiber optic sensor for cryogenic temperature range according to the first embodiment of the present invention.

According to the first embodiment of the present invention the fiber optic temperature sensor, as shown in FIG. 7, comprises the optical fiber for carrying an optical signal, the optical fiber having: a length, a thermal expansion coefficient, at least one core and at least one cladding, the sensor further comprising: at least one grating associated with the core of the optical fiber at a location along the length of the optical fiber, the grating for selectively altering portions of the signal carried by the optical fiber; and a coating integrated with the cladding at the location, the coating for increasing the sensitivity of the sensor to changes in temperature at the location, the coating having a thermal expansion coefficient that is smaller than the thermal expansion coefficient of the optical fiber but larger in absolute value than the thermal expansion coefficient of the optical fiber at least over a range of temperatures. Said optical fiber can be a single mode silica optical fiber (for a nonlimiting example, SMF29 or polarization maintaining fiber). Alternatively, said optical fiber can have more than one core or of other types of optical fiber known to those skilled in the art. Said at least one grating can be a Fiber Bragg grating which has spectrally resolved reflection peak and transmission valley due to Bragg resonant reflection, the position of said spectral feature being changing in response to the strain or thermo-optic effect in the position of the Fiber Bragg grating. Alternatively, said at least one grating can be a long period grating which has spectrally resolved transmission valley due to the outcoupling of the optical fiber modes from the core, the position of said transmission valley being changing in response to the strain or thermo-optic effect in the position of the Fiber Bragg grating. Said coating can be of nanocomposite material in the form of CuO nanoparticles with diameters in the range of 3 nm and 100 nm (preferably in the range of 3 nm and 15 nm) embedded into the polymer matrix. Alternatively, said coating can be of nanocomposite material in the form of antiperovskite nanoparticles embedded into the polymer matrix.

It is specifically should be noted that nanoparticles may be coated with protective coating, such as, for a nonlimiting example, carbon coating, or any other suitable protective coating known to those skilled in the art to ensure environmental stability of said nanoparticles during further processing, such as dispersing and curing in polymer matrix, fiber recoating, etc.

Said fiber optic temperature sensor can be packaged in strain relieved package known to those skilled in the art, to mitigate the strain-induced error in temperature measurements. Alternatively, said fiber optic temperature sensor may be used in conjunction with another closely located strain sensor (which can be, for a nonlimiting example, of fiber optic type as well) to mitigate strain effects on the signal from fiber optic temperature sensor via data processing.

Figure 8:
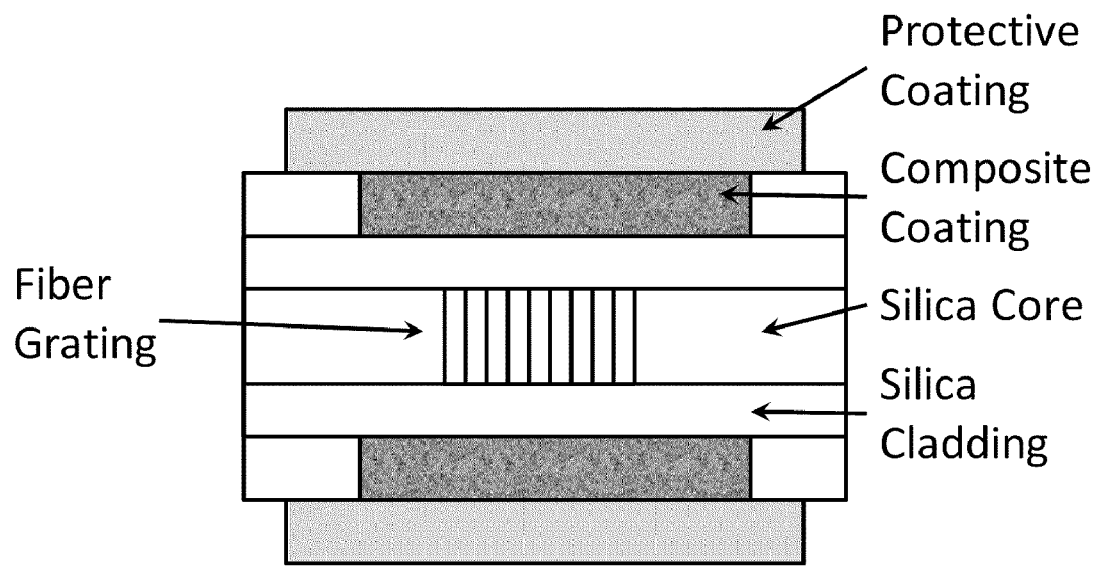
FIG. 8 shows an illustrative exemplary schematic drawing of the fiber optic sensor for cryogenic temperature range according to the first embodiment of the present invention with protective coating.

Said fiber optic temperature sensor of the present embodiment can be used unpackaged in environments where said coating is chemically inert. However, there is a number of applications where ambient environment is highly chemically active even at cryogenic temperatures (for a nonlimiting example, liquid oxygen). In order to perform temperature measurements in such environment a protective coating can be used on the top of the nanocomposite coating as schematically illustrated in FIG. 8

Figure 9:
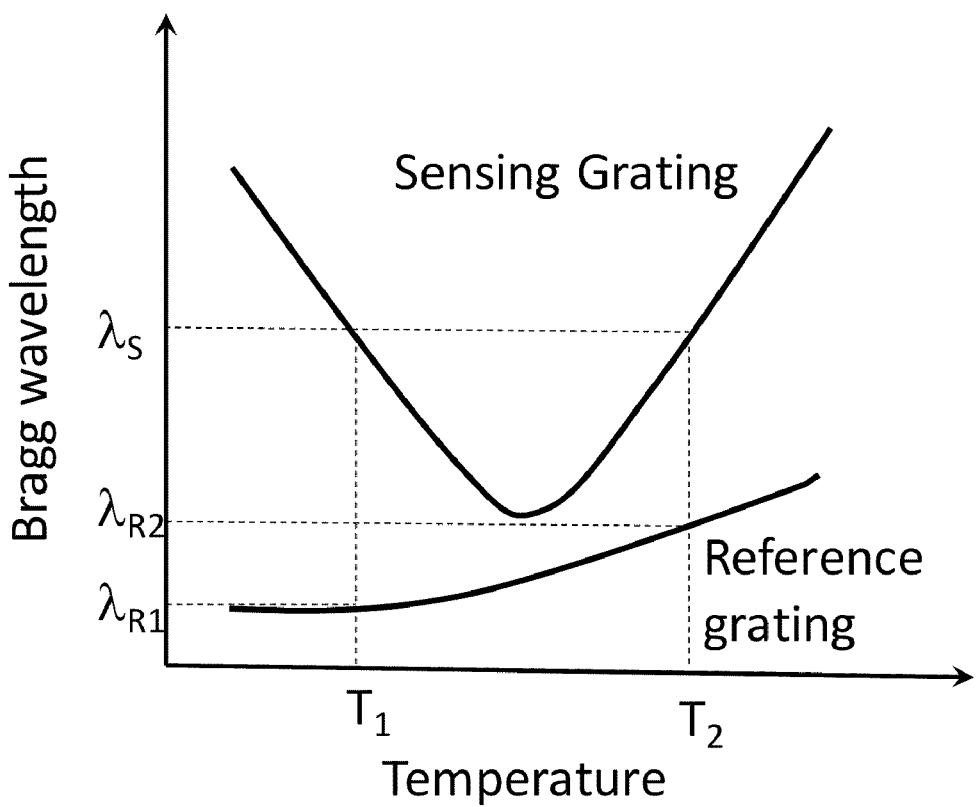
FIG. 9 shows an illustrative exemplary schematic drawing of the temperature dependences of the Bragg wavelength for fiber optic temperature sensor of the first embodiment and of the reference temperature sensor.

It should be specifically noted that due to the chance of the signs of coefficient of thermal expansion of the coating of the present invention the sensor curve (the temperature dependence of Bragg wavelength) for the fiber optic sensor of the present embodiment will have an inflection point (located anywhere between 100K and 200K for a nonlimiting example of coating containing CuO nanoparticles). This will result in two values of temperature per each spectral position of the Bragg spectral feature, as illustrated in FIG. 9, providing significant uncertainly in the measurements. To mitigate such an uncertainly, the reference temperature sensor can be used in conjunction with the fiber optic temperature sensor of the present invention. For a nonlimiting example this reference temperature sensor can be fiber optic sensor as well, just without the nanocomposite coating. While such a sensor will have much lower temperature sensitivity, its sensitivity will be sufficient to unambiguously identify the temperature range, as illustrated in FIG. 9: Each temperature will uniquely correspond to the combination of Bragg wavelength from sensing grating $\lambda_S$ and reference grating $\lambda_R$.

According to another aspect of the present embodiment, the fiber optic temperature sensor of the present invention can be used in conjunction with the magnetic field sensor to offset possible drift of the signal due to the external magnetic field.

The fiber optic temperature sensor of the first embodiment of the present invention can be used with any fiber Bragg grating interrogation instrumentation known to those skilled in the art. These include but not limited to Optical Time Domain Reflectometry (OTDR), spectroscopy (tunable laser spectroscopy, spectroscopy with incoherent broadband source, or any other spectroscopic fiber grating characterization technique known to those skilled in the art), Optical Frequency Domain Reflectometry (OFDR), polarimetry, interferometry or a combination of aforementioned techniques.

The fiber optic temperature sensor of the first embodiment of the present invention can be surface-mounted to the surface of the device under test to measure the surface temperature of said device under test. Alternatively, the fiber optic temperature sensor of the present invention can be embedded into the device under test to measure sub-surface temperature of said device under test.

Figure 10:
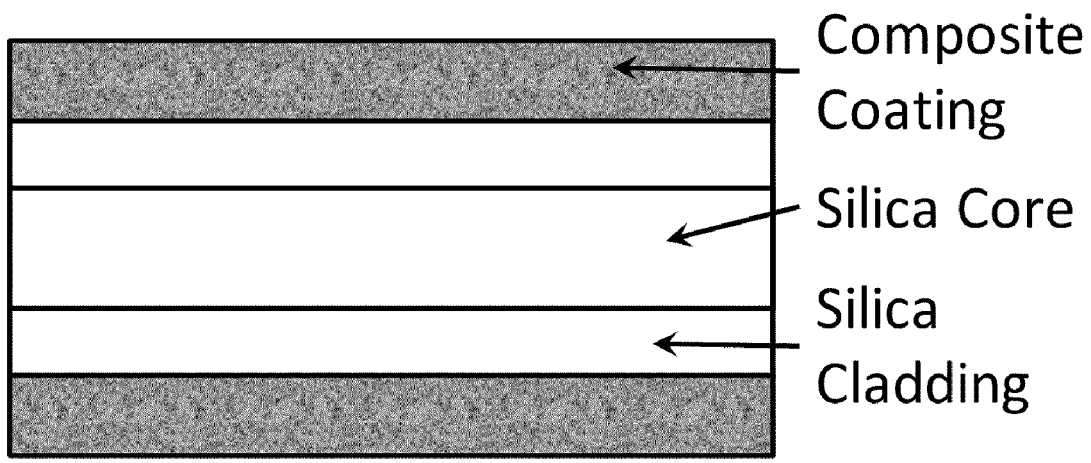
FIG. 10 shows an illustrative exemplary schematic drawing of the fiber optic sensor for cryogenic temperature range according to the second embodiment of the present invention.

According the second embodiment of the present invention the fiber optic temperature sensor of the present invention comprises Rayleigh scattering-based sensor, illustrated in FIG. 10, which comprises, the optical fiber for carrying an optical signal, said optical fiber having a length, a thermal expansion coefficient, at least one core and at least one cladding, the sensor further comprising at least one section of the optical fiber at a location along the length of the optical fiber; and a coating integrated with the cladding at the location of said section, the coating for increasing the sensitivity of the sensor to changes in temperature at the location, the coating having a thermal expansion coefficient that is smaller than the thermal expansion coefficient of the optical fiber but larger in absolute value than the thermal expansion coefficient of the optical fiber at least over a range of temperatures. Temperature sensing with Rayleigh scattering, inherent to optical fiber itself, can be done with utilization of OFDR and is well known to those skilled in the art (see, e.g. [D. K. Gifford, B. J. Soller, M. S. Wolfe, and M. E. Froggatt, "Distributed fiber-optic temperature sensing using Rayleigh backscatter," in European Conference on Optical Communication, vol. 3 of ECOC 2005 Proceedings (2005). Paper We4.P.005]). All the aspects related to the fiber optic temperature sensor of the first embodiment of the present invention can be equally applied to the present embodiment as well.

Applications of the disclosed fiber optic sensor for cryogenic temperature range include monitoring the cavity losses in superconducting cavities for accelerators, monitoring temperature spikes in superconductor power lines, monitoring temperature in cryogenic propulsion systems, monitoring temperature of superconducting magnets in Nuclear Magnetic Resonance and Magnetic Resonance Imaging systems and any other applications where multiplexing, electromagnetic interference immunity, small footprint or low thermal mass are required.

The fiber optic temperature sensor of the present invention can be fabricated by taking nanoparticles exhibiting large negative expansion coefficient at cryogenic temperature range (significantly larger in absolute value than that of silica), fabricating the nanocomposite material by mixing such nanoparticles with polymer and recoating the optical fiber. Let's discuss in more detail the exemplary nonlimiting case of fabricating fiber optic temperature sensor of FBG type utilizing CuO nanoparticles:

It should be noted that not all CuO nanoparticles exhibit negative CTE behavior at cryogenic temperatures. Zheng et al. [Zheng, X. G. et al. Nature Nanotech. 3, 724-726 (2008)] reported huge negative CTE on ball-milled CuO nanoparticles measured by X-ray diffraction and suggested that the large NTE is of magnetic origin due to crossover temperature at which positive thermal expansion changes to negative thermal expansion being roughly the same as the magnetic ordering temperature TN in bulk CuO. Further, Zheng et al. implied that the effect can be of magnetolattice origin, although no additional discussion/arguments have been provided.

The statement of Zheng that the effect of magnetic origin appears to be substantiated: apparent similarity of thermal dependence of magnetic susceptibility of ball-milled CuO nanoparticles measured by Arbuzova et al. [T. I. Arbuzova et al., Journal of Magnetism and Magnetic Materials 258-259 (2003) 342-344] also indirectly confirms this fact. We further suggest that the observed large negative NTE in ball-milled 5 nm diameter CuO nanoparticles is due to two main effects: 1) Magneto-volume effect (also known as static magnetostriction), and 2) Presence of two phases in ball-milled CuO nanoparticles: ordered antiferromagnetic core and paramagnetic surface layer (or shell), with possible disappearance of antiferromagnetic core at very small nanoparticles. Magneto-volume effect is well known for causing significant negative CTE around Curie temperature for different materials.

The static magnetostriction $\omega_m(T)$ is expressed by $$\omega_m(T)=3\int\alpha_m(T)dT=kC_{mv}\{M(T)^2+\xi(T)^2\}$$

Where $\alpha_m(T)$ is the magnetic contribution of the linear thermal expansion coefficient at temperature T, k and $C_{vm}$ are the compressibility and the magneto-volume coupling, and $M(T)$ and $\xi(T)$ are the amplitudes of local magnetic moment and spin fluctuation respectively. Since magnetic susceptibility, $\chi(T)$ is nothing else than a magnetization (the magnetic dipole moment per unit volume) per unit field, it is apparent that the behavior of magnetic susceptibility and thermal expansion in CuO nanocrystals are closely related.

Magnetic properties of bulk crystalline CuO are defined by a strong antiferromagnetic superexchange of $Cu^{2+}$ ions via $O^{2-}$ ions in the [1 0 1] direction and a weaker ferromagnetic bond in all other directions. The magnetic structure can be represented in the form of zigzag Cu—O—Cu antiferromagnetic chains extended along the [1 0 1] direction. Competition of the intrachain and interchain exchange interactions leads to a 3D-collinear antiferromagnetism below T=212 K. A 3D-noncollinear magnetic structure is realized in the range 212K<T<$T_N$=230 K. Above $T_N$ the interaction between the chains is negligible and the system transforms into low-dimensional antiferromagnetic state. The $\chi(T)$ dependences samples with d>70 nm measured by Arbuzova et al. [T. I. Arbuzova et al., Journal of Magnetism and Magnetic Materials 258-259 (2003) 342-344] are coinciding with those for CuO polycrystals (d=5-15 mm) prepared by the chemical synthesis method. These dependences have the shape characteristic of a low-dimensional 1D or 2D antiferromagnets, which undergo a phase transition to the 3D state with a long-range magnetic order as the temperature decreases. Near $T_N$ a maximum of the susceptibility is absent and only the slope of the $\chi(T)$ curve changes. The decrease of grain (or nanoparticle) size to below 70 nm leads to the increase of the susceptibility below ~140K and the appearance of the "paramagnetic" contribution, $\chi\sim 1/T$ [T. I. Arbuzova, et al., Phys. Solid State 43 (5) (2001) 846], which is contributing to negative CTE.

Magnetic properties of CuO particles with d<70 nm can be explained by the presence of a two magnetic phases in nanoparticles (or nanograins): ordered antiferromagnetic core and paramagnetic surface layers. Due to the lack of 3d periodicity and the exchange frustration the $Cu^{2+}$ spins localized in surface layers may be disordered. The directions of the magnetic moments are defined both by the exchange energy and the anisotropy energy. The anisotropy energy depends not only on the crystalline anisotropy, but also on other factors (surface anisotropy, elastic stress). However, in consequence of an intensive deformation during, for a nonlimiting example, the ball milling the nanoparticle's surface layers can be at a nonequilibrium state. Spin-fluctuations near the minimum energy in turn result in the surface spins being in a paramagnetic state. The reason for the low-temperature increase in the susceptibility (and appearance of giant negative CTE) can be defects, which break the exchange bonds. The orientation of $Cu^{2+}$ moments can be altered in an incomplete coordination shell for surface ions. To account for surface spin disorder in magnetic nanoparticles, Codama et al. [R. H. Codama, J. Magn. Magn. Mater. 200 (1999) 359] suggested that the existence of oxygen vacancies near the surface. Investigations of positron annihilation in the CuO nanoceramics confirm the presence of micropores of this vacancy type at CuO surface. In such an explanation the temperature dependence of $\chi(T)$ can be described by the relationship $$\chi=(1-x)\chi(CuO)+x\chi(Cu^{2+})=(1-x)\chi(CuO)+x[Ng^2S(S+1)\mu_B^2/3kT]$$

where x is the concentration of $Cu^{2+}$ paramagnetic ions, S=½ and g=2 and $\chi(CuO)$ is the magnetic susceptibility of bulk CuO. Hence, one can qualitatively expect that the static magnetostriction (or, in other terms, magneto-volume effect) in ball-milled CuO nanoparticles will have the following form:

$$\omega_m(T)=A_0(T)+A_1(T)/T+A_2(T)/T^2$$

Where coefficients $A_i$ that can be derived. From such a picture of the origin of giant negative CTE in CuO nanoparticles by Zheng et al., it follows that CuO nanoparticles have to have certain types of defects. Thus, the following illustrative methods of CuO nanoparticles fabrication can be used: 1) ball milling of CuO granular material provided by, for a nonlimiting example, Sigma Aldrich, using 2 mm milling balls and mass mixture of CuO to balls in the range of 10:1 to 20:1 for the duration of time in the range of 10 hours and 60 hours at 400 rpm with following size sorting; 2) Ball milling of chemically synthesized CuO nanoparticles (fabricated, for example by microwave synthesis from $Cu(CH_3COO)2$/ethanol, NaOH/ethanol and PEG solutions); 3) by electron irradiating of CuO nanoparticles (fabricated by either chemical synthesis or ball milling) following the conditions (fluence of $\Phi=5\times10^{18}$ cm$^{-2}$ of 5.5 MeV electrons) described by Arbuzova et al. [T. I. Arbuzova et al., Physics of the Solid State, 2009, Vol. 51, No. 5, pp. 953-960].

After the CuO nanoparticles or the proper thermal expansion behavior are obtained, the nanoparticles should be mixed in the right proportion with polymer material (such as, for nonlimiting examples, Stycast, Epotek or Duralco epoxy resins), possibly with addition of ~1% of Esperse 130 (dispersant aid), well stirred at room temperature in, for example, ultrasonic bath, and recoated over the optical fiber with preliminary written FBG with following annealing. Other known to those skilled in the art methods of mixing nanoparticles and polymers to form uniform nanocomposite fiber coating can be used in conjunction to the present invention as well.

While the invention has been described in connection with what is presently considered to be the most practical and preferred embodiment, it is to be understood that the invention is not to be limited to the disclosed embodiments. For example, while in specifications silica fibers have been disclosed in conjunction with the temperature sensor of the present invention, other type of optical fibers (photonic crystal fiber, as well as optical fibers made of different materials) can be equally used. Therefore, the metes and bounds of invention are defined by the claims—not by this specification—and are intended to cover various modifications and equivalent arrangements included within the scope of those claims.

What is claimed is:
1. An optical fiber temperature sensor comprising: the optical fiber for carrying an optical signal, the optical fiber having:
   a length,
   a thermal expansion coefficient,
   at least one core and
   at least one cladding,
   the sensor further comprising:

at least one grating associated with the core of the optical fiber at a location along the length of the optical fiber, the grating for selectively altering portions of the signal carried by the optical fiber; and a coating integrated with the cladding at the location, the coating for increasing the sensitivity of the sensor to changes in temperature at the location, the coating having a thermal expansion coefficient that is smaller than the thermal expansion coefficient of the optical fiber but larger in absolute value than the thermal expansion coefficient of the optical fiber at least over a range of temperatures.

2. The optical fiber temperature transducer of claim 1 wherein the grating is selected from the group consisted of fiber Bragg grating and long period grating.

3. The optical fiber temperature sensor of claim 1 wherein the coating is formed of the composite containing polymer matrix and nanoparticles distributed in said matrix.

4. The optical fiber temperature sensor of claim 3 wherein said nanoparticles are CuO nanoparticles with diameters in the range of 3 nm and 30 nm.

5. The optical fiber temperature sensor of claim 4 wherein said CuO nanoparticles have a protective coating.

6. The optical fiber temperature sensor of claim 3 wherein said nanoparticles are made of antiperovskite-structured material selected from the group consisted of $Mn_3CuN$ and $Mn_3ZnN$, said antiperovskite-structured material being doped by the chemical element selected from the group consisted of Ge, Sn, Ga, Nb, Si.

7. The optical fiber temperature sensor of claim 6 wherein said antiperovskite-structured nanoparticles have a protective coating.

8. The optical fiber temperature sensor of claim 1 wherein a strain-relieving package is provided around the sensor.

9. The optical fiber temperature sensor of claim 1 wherein the sensor is used in the reflection mode.

10. The optical fiber temperature sensor of claim 1 wherein the sensor is used in the transmission mode.

11. The optic fiber temperature sensor of claim 1 wherein the protective coating is provided on the top of said coating.

12. The optical fiber temperature sensor of claim 1 wherein at least one reference temperature sensor is provided in a close vicinity of said fiber optic temperature sensor for improved accuracy of said fiber optic temperature sensor.

13. The optical fiber temperature sensors of claim 12 wherein said at least one reference temperature sensor is a fiber optic temperature sensor selected from the group consisted of Fiber Bragg grating sensor, Long period grating sensor and Rayleigh scattering-based sensor.

14. The optical fiber temperature sensor of claim 1 wherein at least one reference strain sensor is provided in a close vicinity of said fiber optic temperature sensor for the reduction of strain effects on optical fiber temperature sensor readings.

15. The optical fiber temperature sensor of claim 1 wherein at least one reference magnetic field sensor is provided in a close vicinity of said fiber optic temperature sensor for improved accuracy of said fiber optic temperature sensor.

16. An optical fiber temperature sensor comprising: the optical fiber for carrying an optical signal, the optical fiber having:
　a length,
　a thermal expansion coefficient,
　at least one core and
　at least one cladding,
　the sensor further comprising:
　　at least one section of the optical fiber at a location along the length of the optical fiber; and
　　a coating integrated with the cladding at the location of said section, the coating for increasing the sensitivity of the sensor to changes in temperature at the location, the coating having a thermal expansion coefficient that is smaller than the thermal expansion coefficient of the optical fiber but larger in absolute value than the thermal expansion coefficient of the optical fiber at least over a range of temperatures.

17. The optical fiber temperature sensor of claim 16 wherein the coating is formed of the composite containing polymer matrix and nanoparticles distributed in said matrix.

18. The optical fiber temperature sensor of claim 17 wherein said nanoparticles are CuO nanoparticles with diameters in the range of 3 nm and 30 nm.

19. The optical fiber temperature sensor of claim 18 wherein said CuO nanoparticles have a protective coating.

20. The optical fiber temperature sensor of claim 17 wherein said nanoparticles are made of antiperovskite-structured material selected from the group consisted of $Mn_3CuN$ and $Mn_3ZnN$, said antiperovskite-structured material being doped by the chemical element selected from the group consisted of Ge, Sn, Ga, Nb, Si.

21. The optical fiber temperature sensor of claim 20 wherein said antiperovskite-structured nanoparticles have a protective coating.

22. The optical fiber temperature sensor of claim 16 wherein a strain-relieving package is provided around the sensor.

23. The optical fiber temperature sensor of claim 16 wherein the sensor is used in the reflection mode.

24. The optic fiber temperature sensor of claim 16 wherein the protective coating is provided on the top of said coating.

25. The optical fiber temperature sensor of claim 16 wherein at least one reference temperature sensor is provided in a close vicinity of said fiber optic temperature sensor for improved accuracy of said fiber optic temperature sensor.

26. The optical fiber temperature sensors of claim 25 wherein said at least one reference temperature sensor is a fiber optic temperature sensor selected from the group consisted of Fiber Bragg grating sensor, Long period grating sensor and Rayleigh scattering-based sensor.

27. The optical fiber temperature sensor of claim 16 wherein at least one reference strain sensor is provided in a close vicinity of said fiber optic temperature sensor for the reduction of strain effects on optical fiber temperature sensor readings.

28. The optical fiber temperature sensor of claim 16 wherein at least one reference magnetic field sensor is provided in a close vicinity of said fiber optic temperature sensor for improved accuracy of said fiber optic temperature sensor.

29. The optical fiber temperature sensor of claim 16 wherein the temperature sensitivity of the sensor is caused by temperature changes in Rayleigh scattering characteristics within said length of fiber.

30. The optical fiber temperature sensor of claim 16 wherein the temperature sensitivity of the sensor is caused by temperature changes in Raman scattering characteristics within said length of fiber.

31. The optical fiber temperature sensor of claim 16 wherein the temperature sensitivity of the sensor is caused by temperature changes in Brillouin scattering characteristics within said length of fiber.

* * * * *